Jan. 9, 1951 D. J. LESLIE Re. 23,323
ROTATABLE TREMULANT SOUND PRODUCER
Original Filed July 9, 1945 7 Sheets-Sheet 1
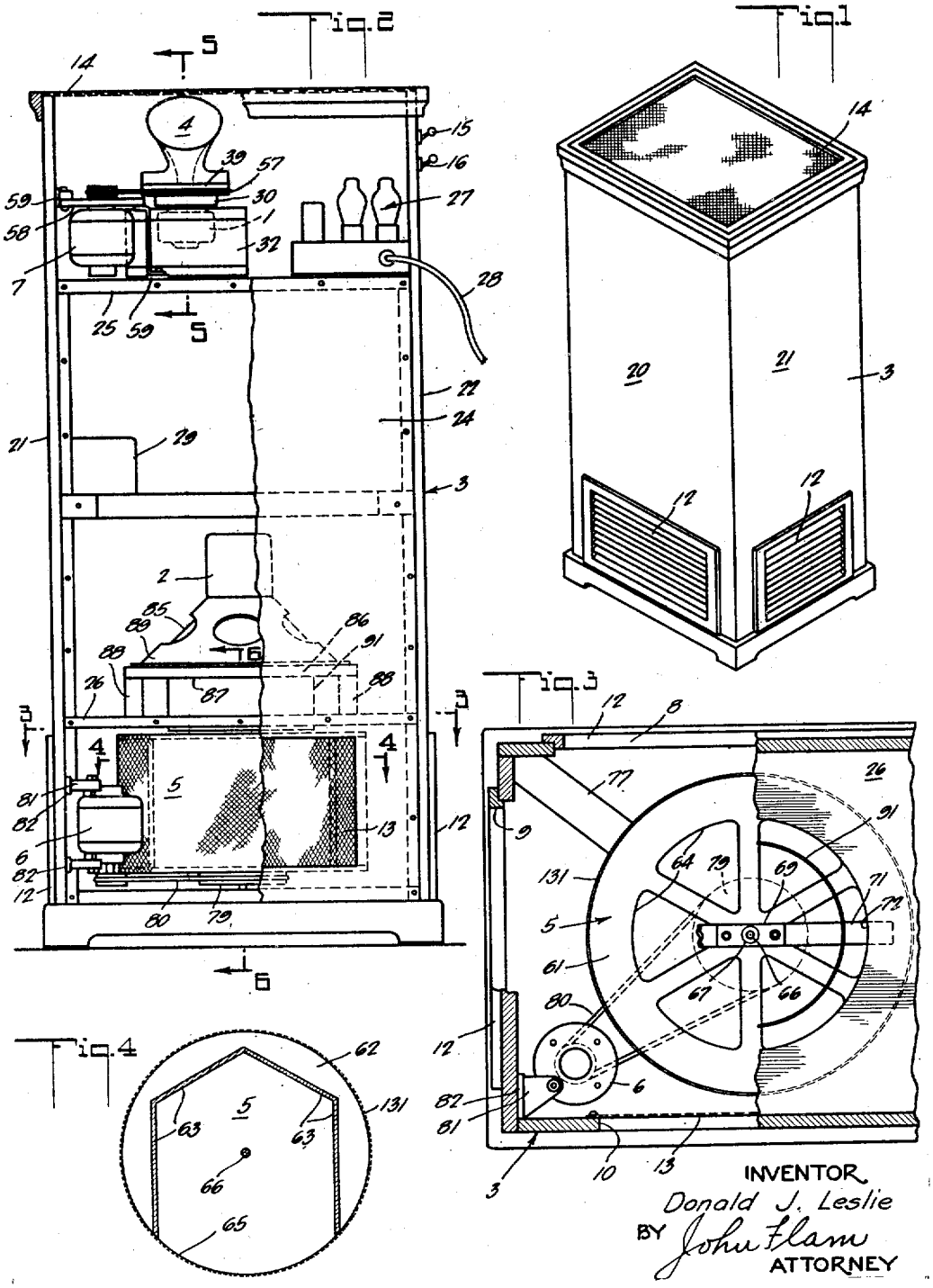
INVENTOR
Donald J. Leslie
BY John Flam
ATTORNEY Jan. 9, 1951 D. J. LESLIE Re. 23,323
ROTATABLE TREMULANT SOUND PRODUCER
Original Filed July 9, 1945 7 Sheets-Sheet 2
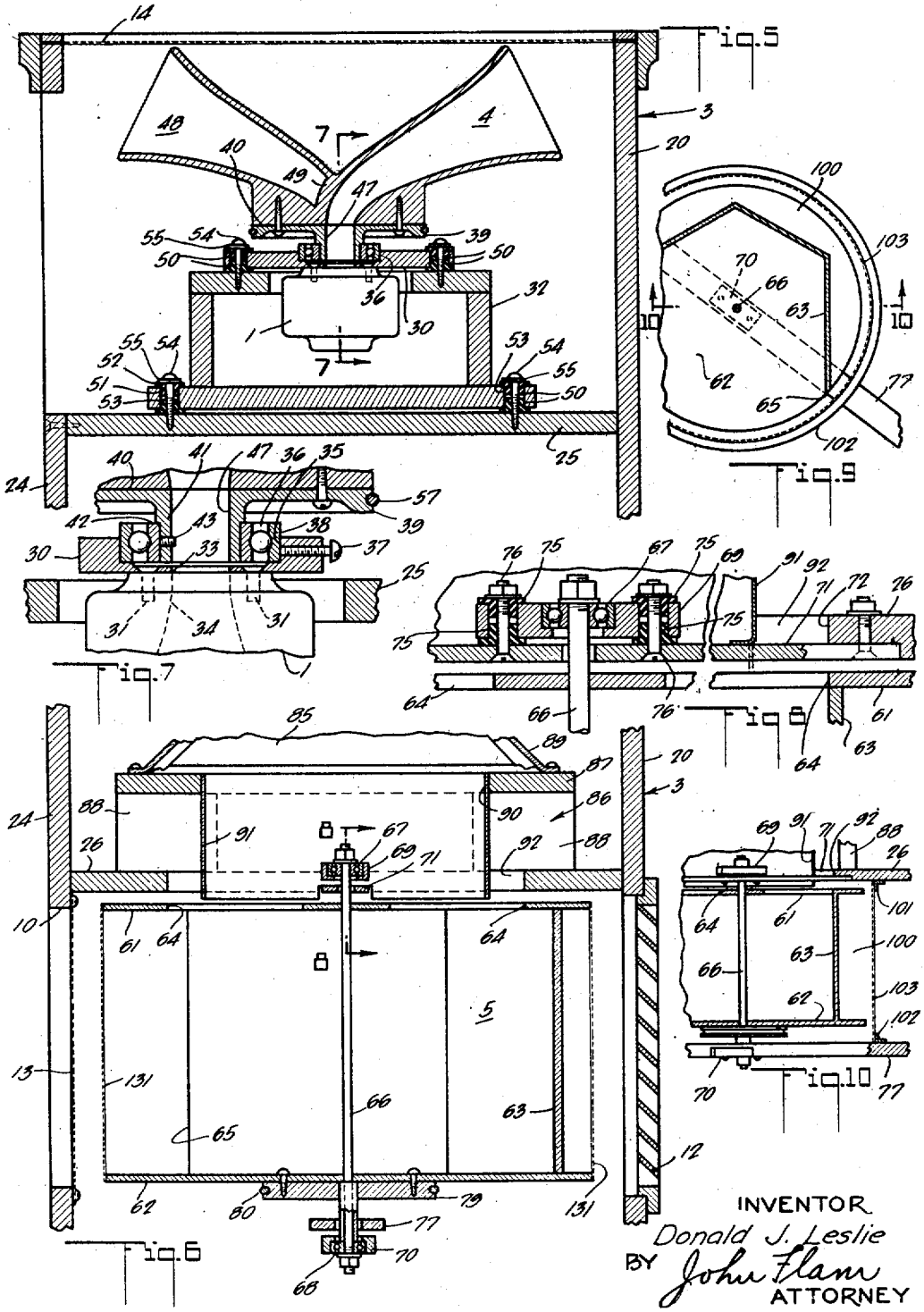
INVENTOR
Donald J. Leslie
BY John Flam
ATTORNEY

ROTATABLE TREMULANT SOUND PRODUCER

Original Filed July 9, 1945 7 Sheets-Sheet 3

INVENTOR
Donald J. Leslie
BY John Flam
ATTORNEY

ROTATABLE TREMULANT SOUND PRODUCER

Original Filed July 9, 1945 7 Sheets-Sheet 4

INVENTOR
Donald J. Leslie
BY John Flam
ATTORNEY

ROTATABLE TREMULANT SOUND PRODUCER

Original Filed July 9, 1945 7 Sheets-Sheet 5

INVENTOR
Donald J. Leslie
BY John Flam
ATTORNEY

ROTATABLE TREMULANT SOUND PRODUCER

Original Filed July 9, 1945 7 Sheets-Sheet 6

INVENTOR
Donald J. Leslie
BY John Flam
ATTORNEY

ROTATABLE TREMULANT SOUND PRODUCER

Original Filed July 9, 1945 7 Sheets-Sheet 7

INVENTOR
Donald J. Leslie
BY John Flam
ATTORNEY

Reissued Jan. 9, 1951 Re. 23,323

UNITED STATES PATENT OFFICE 23,323

ROTATABLE TREMULANT SOUND PRODUCER

Donald J. Leslie, Wilmar, Calif.

Original No. 2,489,653, dated November 29, 1949, Serial No. 603,850, July 9, 1945. Application for reissue March 13, 1950, Serial No. 149,230

13 Claims. (Cl. 181—27)

Matter enclosed in heavy brackets [ ] appears in the original patent but forms no part of this reissue specification; matter printed in italics indicates the additions made by reissue

This invention relates to the production of musical tones, as by electrical or electro-mechanical means.

This application is a continuation, in part, of an application now abandoned, filed on December 10, 1940, in the name of Donald J. Leslie under Serial No. 369,413, and entitled "Acoustic device."

In playing an ordinary musical instrument, as a stringed or wind instrument, or in singing, the pleasing quality of the music may be enhanced, as is well known, by producing a pitch tremolo or vibrato. This vibrato effect, in the case of an instrument, is produced by a slight, rapid motion of the finger on the appropriate key or string, and which causes cyclic and rapid minor variations of pitch.

It is an object of this invention to impose pitch tremolo or vibrato, by mechanical means, on a musical tone.

It is another object of this invention to provide means for operating sound producers incorporating air actuators to secure vibrato effects in a simple and effective manner.

It has been found that cyclic motion at an appropriate rate of a channel forming means utilized for transmitting a tone suffices to impart vibrato to the tone. Thus, it is another object of this invention to obtain vibrato or tremolo effects by cyclic motion, such as may be produced by rotation of a sound transmitting channel.

It is another object of this invention to provide a horn or other means forming a sound channel having special radiating properties, whereby the character of the vibrato is improved.

It is another object of this invention to provide an arrangement whereby it is possible to alter the character of the vibrato.

It is known to provide apparatus which, by appropriate synthesis of electrical currents, produces tones which have timbres the same as tones produced by any ordinary musical instrument. An electric organ, for example, is capable of producing tones having the characteristic sound of organ tones, although no organ pipes are utilized. It is another object of this invention to produce a pitch tremolo by mechanical means in such electrical apparatus.

When sound comes from a restricted locality, there are directional and other effects that are undesirable. It is still another object of this invention to avoid this "point source" effect.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the drawings:

Figure 1 is a pictorial view of a cabinet used for housing one form of the apparatus;

Fig. 2 is a rear elevation of the cabinet, a part of the cabinet being broken away;

Fig. 3 is a section on an enlarged scale, as seen on plane 3—3 of Fig. 2;

Fig. 4 is a detail section as seen on plane 4—4 of Fig. 2;

Figs. 5 and 6 are fragmentary detail sections, as seen on correspondingly numbered planes of Fig. 2;

Fig. 7 is a detail section on an enlarged scale, as seen on plane 7—7 of Fig. 5;

Fig. 8 is a detail section on an enlarged scale, as seen on plane 8—8 of Fig. 6;

Fig. 9 is a section similar to Fig. 4, but of a modified form of the invention;

Fig. 10 is a transverse section, as seen on plane 10—10 of Fig. 9;

Figure 15:
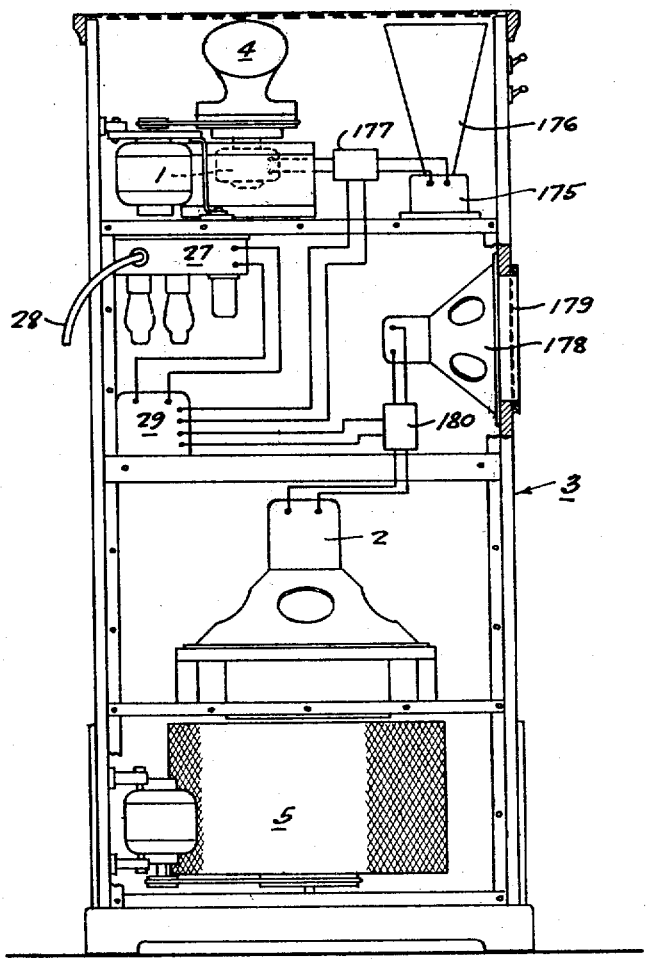
Figure 16:
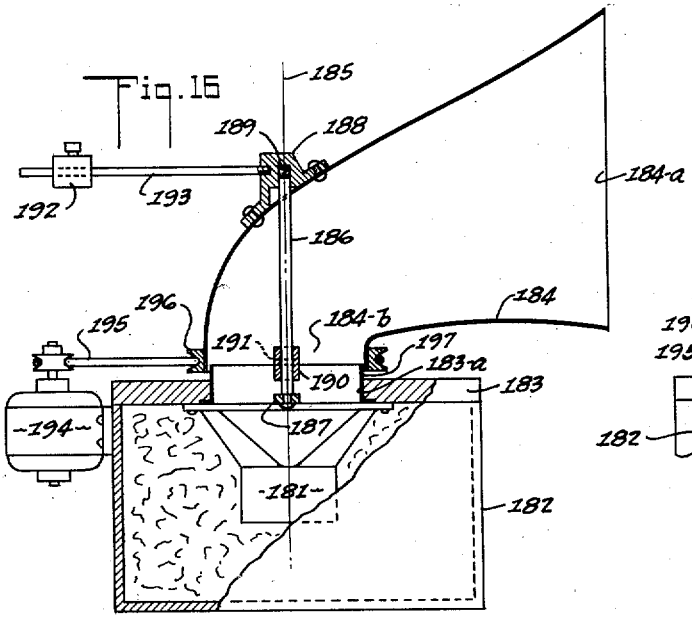
Figure 18:
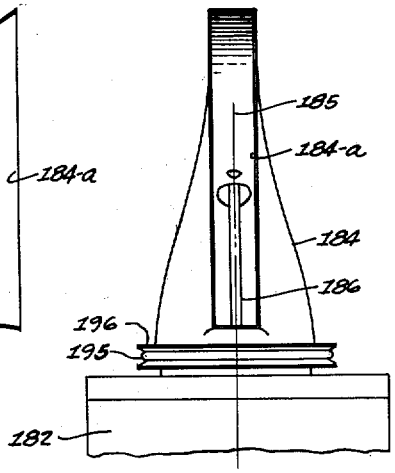
Figure 17:
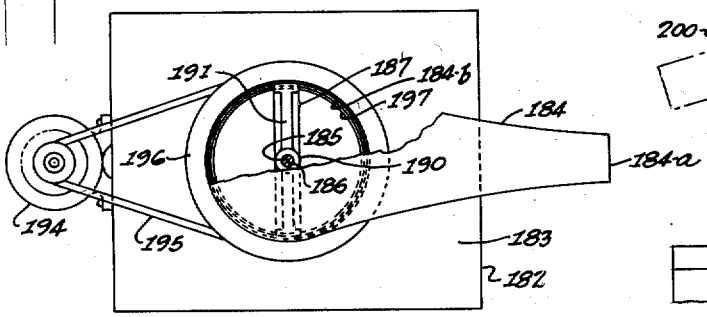
Figure 19:
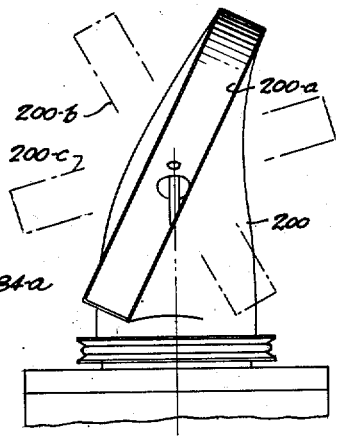
Figure 20:
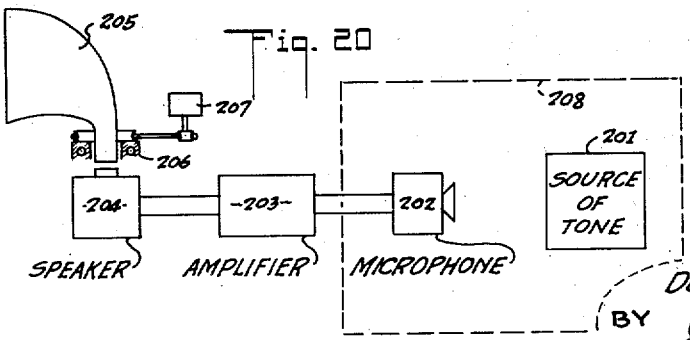
Figure 21:
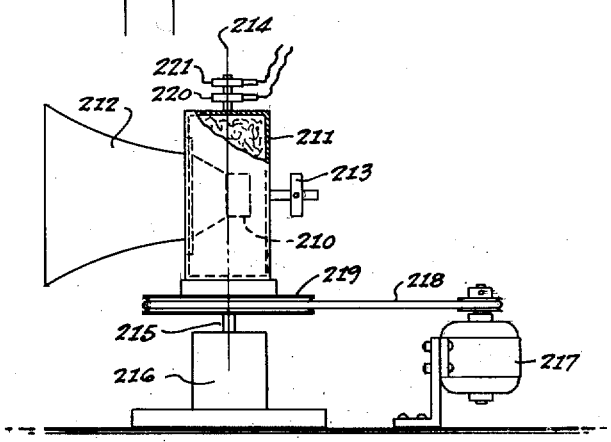
Figure 22:
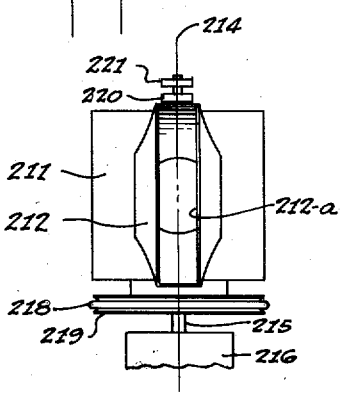
Figure 23:
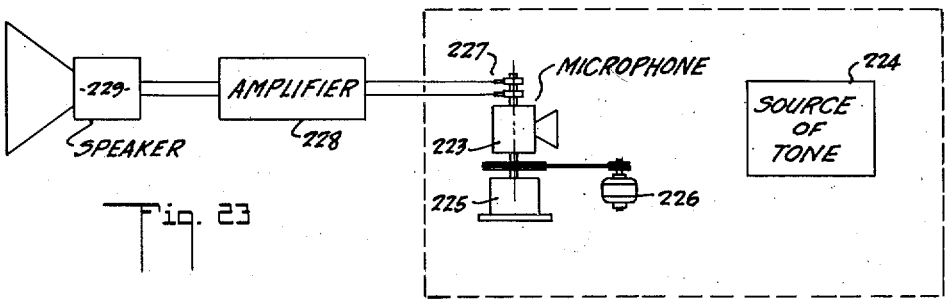
Figure 26:
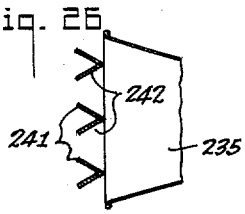
Figure 25:
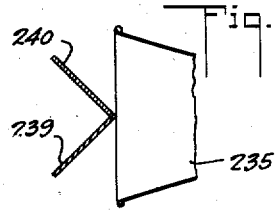
Figure 30:
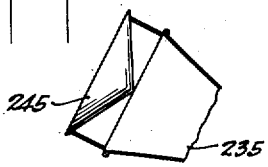
Figure 24:
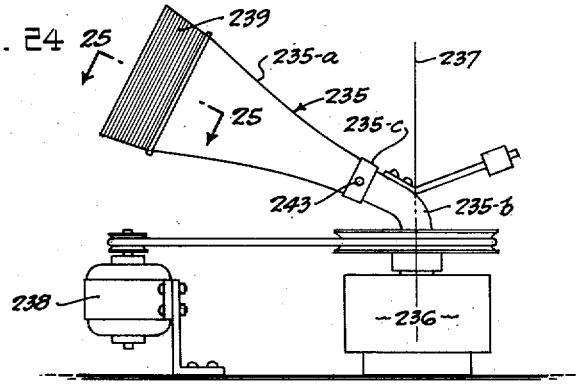
Figure 27:
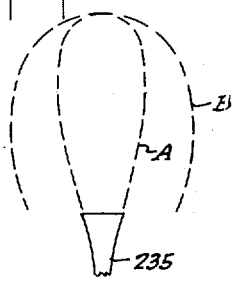
Figure 28:
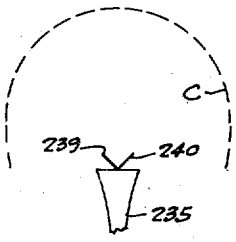
Figure 29:
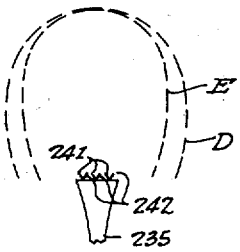

Figs. 11 to 14 inclusive are diagrammatic showings of modified forms of the apparatus;

Fig. 15 is a view similar to Fig. 2, showing a modified form of apparatus;

Fig. 16 is a vertical section, showing another modified form of apparatus;

Fig. 17 is a plan view of the apparatus of Fig. 16;

Fig. 18 is an elevation as seen from the right-hand side of Fig. 16;

Fig. 19 is a view similar to Fig. 18, but showing still another modified form of apparatus;

Fig. 20 is a diagrammatic showing of another modified form of apparatus;

Fig. 21 is an elevation of a further modified form of apparatus;

Fig. 22 is an elevation as seen from the left-hand side of Fig. 21;

Fig. 23 is a diagrammatic showing of another modification of the invention;

Fig. 24 is a schematic showing of still another form of apparatus;

Fig. 25 is a fragmentary section on an enlarged scale, taken as indicated by line 25—25 on Fig. 24;

Fig. 26 is a view similar to Fig. 25, showing a further modification;

Figs. 27, 28, and 29 are diagrams of radiation patterns useful in explaining certain aspects of the invention; and Fig. 30 is a fragmentary view similar to Fig. 24, showing a still further modification of the invention.

When a tone is to be produced by electrical means employing apparatus including a loud speaker, the invention makes it possible to provide a tremolo effect in a simple manner; more specifically, by providing a sound transmitting channel for association with the apparatus, and causing the mouth of this channel to rotate. For example, in one form of the invention, this mouth may serve to emit the sound from the speaker, the rotation thereof being such as to cause the mouth to move alternately toward and away from the hearer at a frequency corresponding to the vibrato. In another form of the invention, the sound transmitting channel may serve to transmit sounds from an appropriate source of tone to a microphone which, in turn, passes current impulses to the speaker. In this case, the rotation of the sound channel is such as to cause the mouth, which receives the tone from the source, to move toward and away from the source. In either case, the pitch of the sound heard by the listener is alternately increased and decreased.

It has been determined experimentally that the vibrato not only imparts a pleasing gliding quality to the tone, but also determines the richness of the tone. For such a result, the speed of rotation should be between about 300 and 450 revolutions per minute, producing a tremolo of between five and seven cycles per second. At rates below these, the tone does not give singleness of pitch, the disturbances in the pitch being perceived as occurring successively in the tones. Furthermore, the richness of the tone is reduced. At rates above these, the richness gives way to an experience of increased complexity, and the gliding character of the tone is lost. Accordingly, the rate of rotation of the sound channel is confined between narrow limits.

In order to produce the proper vibrato effect, the speaker through which the sound passes may be moved cyclically between five and seven cycles per second, as by rotating the speaker.

A rotatable speaker has certain drawbacks, such as the need of rotating a relatively heavy object and of providing a slip ring connection to pass modulated current to the speaker. The same results may be obtained by providing a stationary speaker, or other sound generator, with a directional horn which is rotated about the speaker. Such an arrangement is shown, for example, in Fig. 2 of the drawings. On the other hand, a rotatable speaker is easily connected with the directional horn; and there is no attenuation of high frequencies due to the need of employing a horn providing a bend, as in the case of a stationary speaker. Such a rotatable speaker is shown in Fig. 21.

Similar results are also obtainable by providing a revolving microphone which feeds into a conventional speaker. Since a microphone so arranged moves alternately toward and away from the source of the sound which is being picked up, the pitch of the sound picked up and transmitted to the speaker, or other transducer such as a recording mechanism, will vary. An arrangement of this kind is shown diagrammatically in Fig. 23. However, to avoid the inherent difficulties of a rapidly moving microphone, such as vibration and the need of slip ring connections for the microphone current, it may be preferable to use a revolving directional horn which feeds the sound to a stationary microphone. Such an arrangement is shown diagrammatically in Fig. 11.

Referring to Fig. 2 of the drawings, a high frequency speaker or sound generator 1 and a lower frequency speaker or sound generator 2 are shown as housed within a cabinet 3. Associated with each speaker respectively are means forming directional horns 4 and 5 (see Figs. 5 and 6). Each of these horns forms a sound channel having a mouth or sound emitting opening spaced from the axis of rotation. The horns 4 and 5 are rotatably supported in the cabinet 3 and are arranged to be rotated by motors 7 and 6 respectively. To allow the sound from the speakers to pass out of the cabinet freely, a number of openings are provided. Thus, near the bottom, each side, as well as the front and back of the cabinet has openings, such as 8, 9, and 10 (Figs. 3 and 6) which may be covered by louvres or grills 12, or by a loose fabric as shown at 13. These openings are for the lower speaker 2. The entire top of cabinet 3 is open except for a covering 14 of light fabric which permits free passage of sound from the upper speaker 1.

As the horns 4 and 5 are rotated, the pitch of the sound reaching the listener's ear from the speakers varies and, as previously discussed, by appropriately choosing the speed of rotation, a pleasing vibrato effect is obtained, as well as maximal richness of tone.

Also, since the sound is not received by the ear from a fixed and limited area, but, instead, partly from an area whose position is continually changing and partly by reflection from surrounding walls and adjacent objects, a pleasing sense of space and depth of tone is obtained, and the phenomenon of a "point source" is avoided.

Referring in more detail to the apparatus, the cabinet 3 is permanently closed on the front and sides 20, 21, and 22, and is partly closed on the back by a removable panel 24. Cabinet 3 is also provided with an upper shelf 25 (Figs. 2, 5, and 7) for supporting the high frequency speaker 1, together with its horn 4 and driving motor 7, and a lower shelf 26 (Figs. 2, 6, and 8) for supporting the low frequency speaker 2.

As before mentioned, the apparatus is intended for use in connection with an electronic device. Thus, the final amplifier stages of such a device may be conveniently placed on the upper shelf 25, as indicated by 27 (Fig. 2), and connected by means of a suitable cable 28 with the device, such as an electric organ. The amplifier 27 may be connected with the speakers 1 and 2 by suitable cables (not shown) in a conventional manner, a suitable dividing network generally indicated by 29 (Fig. 2) being interposed in the connections to limit the frequencies supplied to the respective speakers. The connections between an appropriate amplifier and high and low frequency speakers are well understood by those skilled in the art and, accordingly, will not be detailed here. Appropriate leads (not shown) also supply current to motors 6 and 7, switches 15 and 16 (Fig. 2), located on the exterior and near the top of cabinet 3, serving to control the motors respectively.

As clearly shown in Figs. 5 and 7, the high frequency speaker 1 is secured to the underside of a rectangular plate 30, as by screws 31. Plate 30 may be of suitable relatively light material which machines readily, such as fibre, and is supported with respect to shelf 25 by a box-like frame 32. Plate 30 is provided with a central bore 33 which is aligned with the speaker opening 34. Bore 33 is provided with a counterbore 35 which has an anti-friction radial and thrust bearing 36 mounted therein. A long set screw 37, threaded into the fibre plate 30, engages the outer race 38 of bearing 36 and secures bearing 36 in plate 30. A pulley 39 with a flat upper face 40 has a tubular hub 41 which is secured to the inner race 42 of bearing 36, as by a headless set screw 43.

Mounted on the upper face 40 of pulley 39 is a horn 4, which horn extends upwardly and away from the opening 47 in hub 41. Horn 4 is preferably an exponential type horn, and serves to direct the sound waves from speaker, these waves passing out of cabinet 3 through the open top thereof. To maintain the horn 4 in mechanical balance, a similar horn 48 may be mounted diametrically opposite horn 4. The sound waves, however, do not enter horn 48, a wall 49 serving to separate horn 48 from horn 4.

It is important that vibrations from the rotating apparatus be prevented from reaching the cabinet. Accordingly, plate 30 is resiliently supported on frame 32; and frame 32 is, in turn, resiliently supported on shelf 25 by means of rubber bushings 50. These bushings 50 each have a cylindrical body portion 51 surmounted by a flange 52, and are mounted in pairs by being inserted in a suitably sized opening 53 in the member to be supported, the flanges 52 engaging the opposite faces of the member. A screw, as 54, is then passed through a central opening in the bushings 50 into the supporting member, as 25, a suitable washer 55 being interposed between the head of screw 54 and the flange 52 of the top bushing 50. In this manner, the lower flange 52 is interposed between the member 30 or 32 and its support, the bushings also preventing the screw 54 from directly contacting the supported member. Thus, transfer of vibrations between the horn and its support is effectually prevented.

The motor 7 rotates the horn 4 by means of a belt 57 engaging pulley 39. The motor 7 may be adjustably supported on a bracket 58 in cabinet 3, suitable means such as resilient pads 59 being provided between the bracket and the cabinet to prevent vibration from the motor 7 reaching the cabinet.

The low frequency speaker 2 is also provided with a revolving directional horn 5 (Figs. 2, 3, 4, and 6) which, however, is shown as not being of the exponential type. Horn 5 is built of upper and lower discs 61 and 62, joined by vertical walls 63. The top disc 61 is provided with openings 64 to admit the sound from the speaker 2, the sound passing outwardly through opening 65 in wall 63. The lower disc 62 is imperforate.

The horn 5 is mounted on a central, vertical shaft 66 which is rotatably supported by anti-friction bearings 67 and 68 at its upper and lower ends respectively. Bearings 67 and 68 are respectively supported in fibre blocks 69 and 70. Block 69 is supported on a bar 71 spanning an opening 72 (Fig. 8) in the shelf 26, which opening serves to pass the sound waves from speaker 2 into horn 5. To prevent undesirable transfer of vibrations between horn 5 and the cabinet 3, the block 69 is supported on bar 71 by means of rubber bushings 75 and screws 76 in a manner analogous to that in which bushings 50 support plate 30 and frame 32 on Fig. 5. Block 70 for the lower bearing 68 is similarly supported on a bar 77 (Fig. 9) extending diagonally across the bottom of cabinet 3.

A pulley 79 is mounted on the outside of disc 62, a belt 80 passing over the pulley and operatively connecting the horn 5 with motor 6 (Fig. 3). The motor 6 is adjustably mounted in cabinet 6 by brackets 81, resilient pads 82 being interposed between brackets 81 and the wall 21 which supports them to prevent any vibration from the motor 6 reaching the wall or the cabinet. It is to be understood that the horn structure 61, 62, 63, etc. is rotatively balanced with respect to shaft 66. To reduce the resistance imposed on its rotation by the surrounding air, the peripheries of discs 61 and 62 may be joined by a piece of light fabric 131. This, in effect, makes the structure cylindrical and eliminates "fanning" of the air as the structure is rotated.

To improve the quality of the low frequency production, it may be desirable to use the "reflex" principle. The low frequency speaker 2 is shown as of the type having an air actuating cone 85 of large diameter, for example, fifteen inches. Speaker 2 is supported above horn 5 with cone 85 directed downwardly and axially aligned with the horn by means of a table 86 (Fig. 6). Table 86 comprises a board or plate 87, which may be square for convenience of fabrication, spaced above shelf 26 a short distance by means of blocks 88 at the corners of plate 87. Plate 87 supports the speaker 2 by having frame 89 of the speaker secured to the plate. This plate 87 is provided with a central aperture 90 of a diameter somewhat less than that of cone 85, and a tube 91 extends from aperture 90 down through opening 72 in shelf 25 to disc 61, terminating above the disc 61 to provide suitable running clearance. Thus, sound waves from the lower, or inside, surface of cone 85 pass into horn 5 without mingling with the sound waves from the upper or outside surface of the cone 85. These latter sound waves pass downwardly in the space between plate 87 and the sides of cabinet 3, and enter horn 5 through the annular space 92 defined about tube 91 by the opening 72.

While the speakers have been shown and described as mounted in a single cabinet, this is merely a convenient way of assembling the apparatus, and makes a compact and readily portable unit. The speakers could be in individual cabinets and spaced apart if desired. Further, additional speakers may be provided for either frequency if desired.

Further, it is not necessary that the horns from the high and low frequency speakers rotate in synchronism; in fact, best results are frequently obtained by rotating the speakers at different speeds and in opposite directions.

As an alternative to providing the fabric 131 directly on the structure 5 to reduce the wind resistance, a well 100 may be formed in which the structure 5 revolves, as shown in Figs. 9 and 10. This similarly prevents "fanning" of the air by the rotating structure. The horn 5 is supported between bar 71 on shelf 26 and diagonal bar 77, all as before. A ring 101, formed of a light metal angle and having a diameter slightly greater than that of the horn structure, is mounted on the under side of shelf 26. A similar ring 102 is mounted on the upper side of bar 77. Fabric 103 encircling the horn structure 5 is secured between the angles.

The effect secured by the rotation of the horns, as heretofore stated, is most satisfactory when the speed of rotation is about 400 revolutions per minute, and which fixes the cyclic variation of pitch at the rate of about seven cycles per second. The actual variation in pitch is a function of the instantaneous relative linear velocity of the source with respect to the ear; and this depends, in part, upon the radius of the eccentricity of the mouth or sound emitting opening of the horn to the axis of rotation. This distance is represented, for example, by the radius of the drum 45 of Fig. 5, and may be chosen to suit the particular applications; for example, the radius may be as little as three inches or as much as a foot or two.

That the rate of seven cycles per second is an optimum is shown in the work "Hearing" by Stevens and Davis, published by John Wiley and Sons, at pages 234 to 241. Apparently, this seven cycle value must be closely approached to obtain the most pleasing effects.

As previously mentioned, a tremulant effect is similarly obtainable by providing a stationary microphone with a rotating directional sound channel forming means feeding sound to it. Thus, in Fig. 11, a microphone of any preferred type is indicated by 110 and is shown as provided with a directional horn 111, rotatably supported by an anti-friction bearing 112. A motor 113 rotates horn 111 at the desired speed by means of a belt 114. The sound emanates from a source 115, a suitable sound-proof enclosure 118, indicated by broken lines, being provided to enclose the source and the microphone.

The impulses from the microphone are amplified by a suitable amplifier 116 and are then fed to a speaker 117, which may be a conventional speaker or speakers, or may be a conventional recording apparatus.

Figure 11:
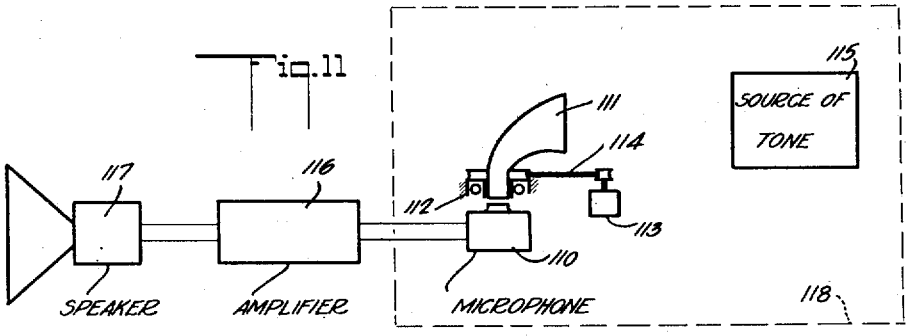
Figure 12:
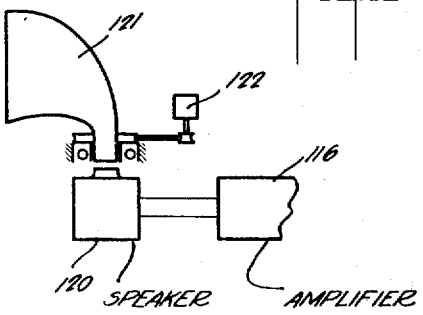
Figure 14:
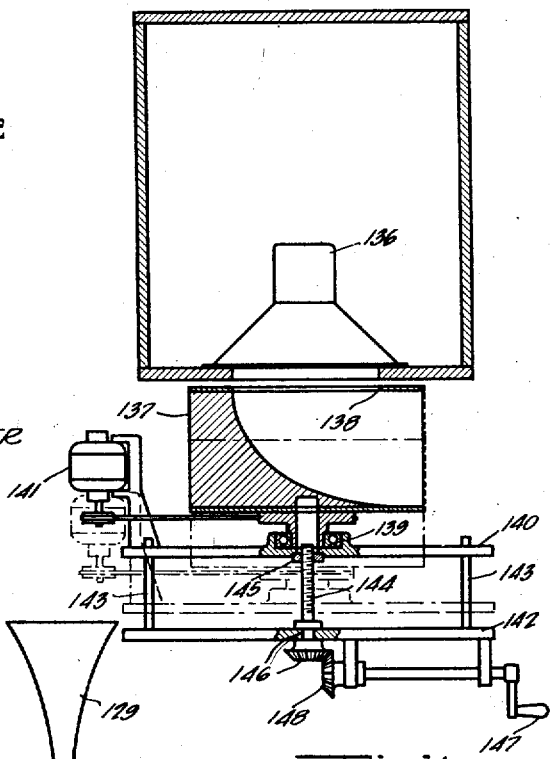
Figure 13:
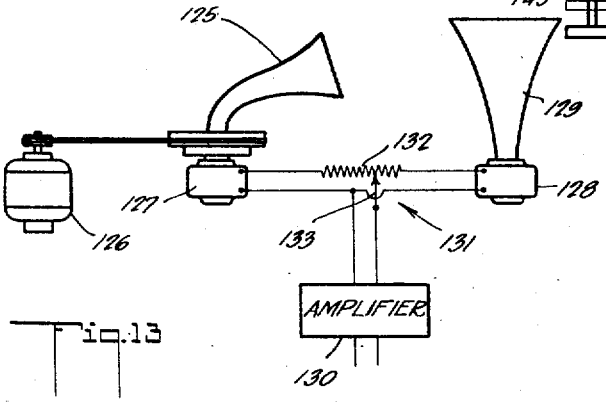

It is also possible to combine the rotating speaker arrangement with the rotating microphone. Such an arrangement is indicated in Fig. 12, wherein a speaker 120, having a directional horn 121 rotated as by a motor 122, is substituted for the translating device 117 of Fig. 11.

It is sometimes desirable to vary the apparent strength of the tremulant. This may be done conveniently by arranging that only a portion of the entire sound produced will have tremolo, and by providing means whereby the amount of this portion relative to the total sound may be altered at will. There are several ways in which this can be done. Thus, in Fig. 13, a rotating directional horn 125, driven by a motor 126, is used to distribute the sound from a stationary speaker 127. A second speaker 128 is provided with a stationary horn 129; and speakers 127 and 128 are connected to a common amplifier 130 by a dividing network 131 including a potentiometer 132.

By adjusting the position of arm 133 of the potentiometer 132, the resistance value in circuit with each speaker may be altered, with resultant changes in the amount of sound delivered by each speaker. It is to be understood that either the high frequency speaker and horn, or the low frequency speaker and horn of Figs. 2 and 3 may be replaced by a combination such as disclosed in Fig. 13, or that the high and low frequency speakers may each be replaced by such an arrangement, adapted to reproduce high and low frequencies respectively. It is also to be understood that speaker 128 may equally well be of some type not requiring a horn.

In Fig. 15, a cabinet 3 is shown which houses a high frequency speaker 1 and a low frequency speaker 2, provided respectively with rotating directional horns 4 and 5. These speakers are fed from a common amplifier 27 through appropriate cables indicated diagrammatically, a dividing network 29 being interposed to limit the frequencies supplied to each speaker, all as shown in Fig. 2. In addition to the high frequency speaker 1, another high frequency speaker is shown at 175. This speaker 175 may have a stationary horn 176 to emit sound upwardly from the cabinet, and is arranged to be fed from a dividing network 177, similar to that shown at 131 of Fig. 13, and interposed in the leads to speaker 1.

A second low frequency speaker may also be provided and is indicated at 178. This may be of the moving cone type wherein no horn is utilized, the sound being emitted through a suitable opening 179 in the side of cabinet 3. This speaker 178 is fed from an appropriate dividing circuit 180 interposed in the leads to speaker 2.

It is possible to use a single speaker and to divide the sound therefrom so that some of it has a tremulant effect while the remainder does not. Thus, in Fig. 14, a stationary speaker 136 delivers sound to a rotating directional horn 137. Suitable means are provided for varying the distance of the mouth 138 of horn 137 from the speaker 136, thus providing a variable opening permitting some of the sound waves to pass from the speaker without passing through the revolving horn 137.

One way in which such a variable opening can be provided will now be described. Horn 137 is rotatably supported by means of a radial and thrust bearing 139 on a movable platform 140, which also carries motor 141 for driving the horn. Platform 140 is guided for vertical movement with respect to the speaker 136 by suitable guide bars 143 on a base plate 142, and is adjustably supported with respect to the base plate 142 by a threaded rod 144 engaging nut 145 fixed on platform 140. Rod 144 is rotatably supported in fixed axial position with respect to base 142 by a suitable bearing 146 and is arranged to be rotated by a hand crank 147 through intervening gearing 148. Obviously, if horn 137 is positioned immediately adjacent horn 136, practically all sound from the speaker will have tremolo. By moving the horn 137 downwardly so that its mouth 138 is spaced from the speaker, some of the sound from the speaker will pass directly to the hearer without passing through the horn; hence will have no tremolo. The rest of the sound will pass through the horn and have tremolo. By varying the spacing between the mouth 138 of horn 137 and speaker 136, the strength of the tremolo can be varied.

In several forms of the invention so far described, the vibrato is obtained by cyclically moving an opening through which the sounds are emitted toward and away from the listener, as by rotating a directing sound horn which provides such opening. With a rotating horn, the rate of movement of the mouth toward and away from the listener is a function of the annular position of the horn, as well as of the length of the horn, such rate of movement approaching zero as the horn approaches a position pointing directly at the listener. Thus, the frequency change and the vibrato also approach zero. Further, the amplitude of the sound is at a maximum with respect to the listener with the horn pointing at him, which further reduces the vibrato effect.

By modifying the usual radiation pattern of a sound horn to obtain broader distribution of the sound, more of the sound from the horn will be heard when the horn is moving toward and away from the listener. Also, the amplitude of the sound will be decreased when the horn is pointed directly at the listener. In this way, a smoother and fuller vibrato effect is obtained. This is particularly important at the higher frequencies where the usual sound horn is highly directive. Furthermore, it may be desirable to provide that all of the sound moves, as nearly as possible, at the same speed with respect to the listener at any given moment. For this purpose, the horn mouth, or other sound emitting opening, should be narrow or of small angular extent in the plane of its rotation.

A speaker adapted for operation in the lower frequencies requires a mouth opening of considerable area; the mouth shape is thus preferably such that its dimension parallel with the axis of rotation is substantially greater than its dimension in the plane of its rotation. A horn of this nature is illustrated in Figs. 16, 17, and 18.

It can be shown that such a horn, having an opening with a dimension in one direction equal to several wave lengths of the sound emitted, and with a dimension in the other direction of less than one-quarter of such a wave length, is highly directive in the plane of its length, or long dimension, but has a broad radiation pattern in the plane of its width, or short dimension. Thus, a horn with a mouth of this character has the double advantage of providing a broad radiation pattern, as well as causing all of the emitted sound to advance with respect to the listener at a more nearly constant instantaneous speed.

In Figs. 16, 17, and 18, a speaker 181 is shown which may be of the type employing a moving cone as the air actuator. The speaker is supported within a casing 182, and with its axis vertically disposed, by being secured to the top wall 183 of the casing 182. The casing or enclosure serves to prevent radiation from the back of the speaker cone, and may be filled with rock wool or other sound absorbent material. An opening 183—a in the top wall 183 serves to transmit sound waves from the speaker 181 to a horn 184 mounted on the casing 182 for rotation about the speaker axis 185. As clearly shown in Figs. 17 and 18, the mouth 184—a of the horn 184 is quite narrow in the plane of rotation of the horn to ensure that sound waves emitted by the mouth all move at substantially the same speed with respect to a listener, as well as produce a broad radiation pattern. At the same time, the mouth 184—a is quite long in a direction parallel with the axis to provide the necessary area.

The horn 184 is supported and guided for rotary movement by means of a stationary vertical shaft 186 mounted in a bar 187 extending across the opening 183—a and fixed to the top casing wall 183. This shaft 186 extends through the upper wall of the horn 184 into a thrust bearing structure 188, a hardened ball 189 therein supporting the weight of the horn by engagement with the end of the shaft 186. A radial bearing 190, supported in the throat of the horn by a bar 191 extending across the throat of the horn and engaging the rod 186, serves to guide the horn for rotary movement about the rod 186.

A counterweight 192 adjustably mounted in an arm 193, extending radially from the thrust bearing 188 opposite the horn 184, serves to balance the weight of the horn 184 about the supporting ball 189, thus reducing the pressure on the radial bearing due to the weight of the horn, as well as maintaining the horn in rotating balance.

The horn 184 is arranged to be rotated at an appropriate speed, as previously discussed, by a small electric motor 194 mounted on the casing 182, and connected by a belt 195 to a pulley structure 196 secured about the throat of the horn. A ring 197 is provided about the opening 193—a and telescopes into the throat 184—b of the horn 184 for sealing against escape of sound passing from the speaker 181 to the horn.

The character of the vibrato may be varied by providing rotating horns, such as just described, with differently proportioned mouths; for example, with mouths variously inclined in the direction of rotation. Fig. 19 is a front view similar to Fig. 18, and shows a horn 200 which has a mouth 200—a, the long dimension of which is oblique with respect to a plane normal to the axis of rotation. This angle of obliquity may be chosen as desired, as indicated by the mouth outlines 200—b and 200—c.

A rotating horn, such as any of the types so far discussed, may be employed as shown schematically in Fig. 20 to impart vibrato to a steady tone as from a source 201. This tone affects a fixed microphone 202 to supply modulated current to an amplifier 203 operating a speaker 204. The sound from the speaker 204 is fed to a directional horn 205, supported for rotation about a vertical axis by a bearing 206 and appropriately driven by a motor 207. An enclosure 208, indicated by broken lines, is provided for confining the sound from the source 201.

In all of the arrangements so far discussed, a rotating horn has been provided in connection with a stationary speaker or microphone. It may be desirable to provide for rotating the speaker or microphone, as in this way a better connection to the horn or other means forming the rotating mouth is possible, and the necessity of employing a curved horn is obviated.

Figs. 21 and 22 show a rotating speaker. Therein, a speaker 210 of any suitable type is shown as enclosed in a casing 211 which may be filled with sound absorbent material to prevent sound radiation from the back of the speaker. A directional horn 212 is mounted on the front of the casing 211 for cooperation with the speaker 210, a suitable counterbalance 213 being provided on the back of the casing. As shown in Fig. 22, the mouth 212—a of the horn 212 is of small angular extent in the plane of rotation and of considerable length parallel with the axis of rotation, thus providing the advantages of a narrow source and a broad radiation pattern, as previously discussed.

The speaker 210 and the horn 212 are supported for rotation about a vertical axis 214 as by the casing 211 being secured to a vertical shaft 215 rotatably supported by a suitable bearing structure 216. The casing 211 is shown as arranged to be driven by a small electric motor 217 connected by means of a belt 218 with a pulley 219 secured to the casing. Modulated current is fed to the speaker 210 by means of slip rings 220 and 221. The horn 212, being without bends, does not materially attenuate the higher frequencies.

In the form shown in Fig. 23, a rotating microphone 223 is provided for receiving tone from a source 224. The microphone 223 is supported for rotation about a vertical axis by a bearing structure 225, and is arranged to be driven at an appropriate speed by means of a motor 226. Current from the microphone 223 is fed by means of a slip ring connection 227 to an amplifier 228 which actuates a speaker 229. It is not necessary that this speaker have a rotating channel or sound emitting opening, since the desired vibrato imposed by the rotation of the microphone 223.

For frequencies where a large opening is required, the horn just described may be preferred. However, horns of rather small dimensions are commonly employed for medium and high frequencies. Such a horn can be readily fitted with some type of deflector at its mouth for altering the radiation pattern of the horn and obtaining smooth vibrato. An arrangement of this sort is shown in Figs. 24 and 25. In Fig. 24 a directional sound horn 235, adapted to transmit sound from a source 236, is arranged to be rotated at a suitable speed about axis 237, spaced from the mouth of the horn, as by a motor 238.

Such a horn will have a radiation pattern of the form indicated by the broken lines in Fig. 27. The sound emitted will have a peak amplitude directly in front of the horn, the higher frequencies having strongly directional characteristics as indicated by the curve marked A, and the medium frequencies being more widely distributed as indicated by the curve B.

By providing a deflector comprising a pair of plates 239 and 240, oppositely inclined across the mouth of the horn 235 in the plane of rotation of the horn, the radiation pattern may be changed to have a form such as that indicated by the wave C in Fig. 28. Therein, it will be noted that the peak amplitude in front of the horn has been substantially reduced and the sound distributed over a wider area. Furthermore, the directional properties of the higher frequencies have been decreased so that these and the medium frequencies have about the same distribution. Such a deflector also affects the vibrato by increasing the apparent length of the horn which increases the Doppler effect.

As shown, the plates 239 and 240 are large with respect to the mouth of the horn 235, and are disposed at right angles with respect to each other. Different radiation patterns may be provided by utilizing larger or smaller plates for a different inclination, or both. Thus, in Fig. 26, several pairs of smaller plates 241 and 242 more steeply inclined are shown as provided across the mouth of the horn 235. The radiation pattern for a horn with such a deflector will be of the type indicated in Fig. 29, and is generally intermediate the curves A and B of Fig. 27 and the curve C of Fig. 28. The amplitude peak directly in front of the horn is not very pronounced and the sound is quite broadly distributed, the medium frequencies (curve D) being somewhat more widely distributed than the higher frequencies (curve E).

The directional characteristics of a horn in the plane of rotation strongly affect the vibrato, while the same characteristics in a plane normal thereto have no effect. Accordingly, if a horn with different directional effects in the two planes is arranged so that its directivity is effective in either its plane of rotation or at 90° thereto, completely different effects can be obtained. Other effects can also be obtained by positioning the horn directed in an intermediate position.

To permit such adjustment of the mouth, the horn 235 is formed of two sections 235—a and 235—b, rotatably coupled by a collar 235—c. Thus, the outer end section 235—a, which has different directional properties in different planes by virtue of the deflector plates 239 and 240, or 241 and 242, may be adjusted to vary the vibrato. A set screw 243 serves to secure the horn section 235—a in adjusted position.

It may be desirable to provide a deflector which will produce the same radiation pattern in all planes. For this purpose, a horn such as 235 may have a conical deflector 245 suitably supported at its mouth, as shown in Fig. 30. Obviously, the proportions of the cone may be varied to produce different characters of vibrato.

The aspects of the invention illustrated in Figs. 16 to 19, inclusive, 21, 22 and 24 to 30, inclusive, form the subjects matter of divisional applications Serial No. 90,649, filed April 30, 1949, for "Acoustic apparatus," and Serial No. 90,650, filed April 30, 1949, for "Sound distributing apparatus."

The inventor claims:

1. In an apparatus of the character described, in combination, a low frequency speaker, having a cone adapted to deliver sound waves from its inner as well as its outer surface, an enclosure for the speaker, one wall of the enclosure having an opening to pass the sound waves from the speaker, means to support the speaker adjacent the opening, said support including means defining a passage for sound waves from the front of the cone only through said opening, said support also providing a passage for the sound waves from the back of the cone to the same opening, a directional horn for receiving the sound waves from one of said passages, and means for rotating said horn.

2. In an apparatus of the character described, in combination, a low frequency speaker, having a cone adapted to deliver sound waves from its inner as well as its outer surface, an enclosure for the speaker, one wall of the enclosure having an opening to pass the sound waves from the speaker, means to support the speaker adjacent the opening, said support including means defining a passage for sound waves from the front of the cone only through said opening, said support also providing a passage for the sound waves from the back of the cone to the opening, a directional horn for receiving the sound waves from said opening, a rotatable support for the horn, and means to rotate the horn.

3. In apparatus for adding pitch tremolo to musical sounds [devoid of pitch tremolo], a cabinet, stationary high and low frequency speakers in the cabinet, supported respectively adjacent the upper and lower ends thereof, a directional horn for each speaker rotatably supported in the cabinet, and means to rotate the horns, there being openings in the cabinet to permit egress of sound.

4. In apparatus for adding a tremulant effect to musical sounds [devoid of pitch tremolo], a stationary sound translating device, a rotating directional horn having a sound channel operatively associated with said device and extending transversely of the axis thereof, means forming another sound channel operatively associated with said device, and means to control the passage of sound in said other channel.

5. In apparatus for adding pitch tremolo to musical sounds [devoid of pitch tremolo], stationary sound translating mechanism, means forming a rotating directional sound channel for said mechanism, means providing another sound channel for said mechanism, and means to alter the volume of sound in one channel compared to that in the other channel.

6. In apparatus for adding pitch tremolo to musical sounds [devoid of pitch tremolo], sound translating mechanism, means forming a rotating directional sound channel having a throat for cooperating with said mechanism, and means to adjust the spacing between said throat and said mechanism whereby the transfer of sound between said sound channel and the translating mechanism may be varied.

7. In apparatus of the character described, a sound translating device, means forming a pair of channels for simultaneous cooperation with said device, means for imparting relative motion between one sound channel and the device for producing a tremulant effect, and means for adjustably distributing the sound between the two channels.

8. In combination, means forming a common source of energy for producing sound waves, means providing separate sound channels cooperating simultaneously with said common source, means whereby one of said channels may be moved cyclically for producing a tremulant effect, and means for adjustably distributing the relative amounts of energy between said channels.

9. In apparatus for adding pitch tremolo effects to musical sounds, a pair of stationary sound translating devices having different frequency ranges, a common source of electrical impulses for both said devices, a pair of means defining air columns, respectively associated with each device, each air column having an opening for emitting sound, and means for rotating both of said air column defining means in such manner as to cause an orbital motion of said openings.

10. In apparatus for adding pitch tremolo effects to musical sounds, a pair of stationary sound translating devices having different frequency ranges, a common source of electrical impulses for both said devices, a pair of means defining air columns, respectively associated with each device, each air column having an opening for emitting sound, and independently controllable means for independently rotating each of said air column defining means in such manner as to cause an orbital motion of said openings.

11. In a tone producing apparatus for an electrical musical instrument, the combination of a pair of loud speakers connected to receive the output of the instrument, one of said speakers being particularly designed to produce tones of a higher audible frequency range, while the other speaker is designed to produce predominantly the tones of the lower audible frequency range, a rotatable elbow-like deflector positioned to receive the acoustic output of said higher frequency speaker, and means to rotate said deflector at a speed in the order of seven revolutions per second.

12. In a tone producing apparatus, the combination of pair of translators for converting electrical impulses into sound, one of said translators being designed to produce predominantly tones of the higher audible frequency range, the other translator being designed to produce predominantly the tones of the lower audible frequency range, a common source of electrical impulses connected to both of said translators, means forming a rotatable air column channel positioned to receive the acoustic output of said high frequency translator, said channel forming means having a sound emitting opening, and means to rotate said channel forming means to cause the sound emitting opening to describe a circular path at a speed of the order of seven revolutions per second.

13. In a device of the character described, a stationary speaker, a directional horn associated with the speaker, means forming an enclosure for the speaker and the horn, a rotatable support for the horn, and means to revolve the horn, there being peripheral openings about the enclosure substantially aligned with the opening of the horn.

DONALD J. LESLIE.

REFERENCES CITED

The following references are of record in the file of this patent or the original patent:

UNITED STATES PATENTS

| Number | Name | Date |
|---|---|---|
| 647,147 | Myers | Apr. 10, 1900 |
| 851,311 | Palmer | Apr. 23, 1907 |
| 1,748,225 | Hoch et al. | Feb. 25, 1930 |
| 2,062,515 | Hoschke | Dec. 1, 1936 |
| 2,114,680 | Goldsmith | Apr. 19, 1938 |
| 2,160,283 | Roberts | May 30, 1939 |
| 2,287,105 | Kannenberg | June 23, 1942 |

FOREIGN PATENTS

| Number | Country | Date |
|---|---|---|
| 447,099 | Great Britain | May 12, 1936 |

OTHER REFERENCES

Bartholomew, "Acoustics of Music," 1942. Published by Prentice-Hall, Inc., 70 Fifth Avenue, New York, New York (pages 22 to 26).